United States Patent [19]

Rosenberger et al.

[11] 3,830,626

[45] Aug. 20, 1974

[54] CONTRAST DYEING OF ARTICLES MANUFACTURED FROM PLASTICIZED POLYVINYL CHLORIDE HOMOPOLYMERS AND COPOLYMERS

[76] Inventors: Bjorn Jossi Rosenberger, Trippestadaasen, Askim; Erik Czypionka, Hoyby, Mysen, both of Norway

[22] Filed: July 14, 1972

[21] Appl. No.: 271,794

Related U.S. Application Data

[63] Continuation-in-part of Ser. No. 168,460, Aug. 2, 1971, abandoned, which is a continuation-in-part of Ser. No. 6,966, Jan. 29, 1970, abandoned.

[52] U.S. Cl. ............................................. 8/4, 8/14
[51] Int. Cl. ............................................. D06p 3/00
[58] Field of Search ............................... 8/4, 14, 15

[56] References Cited
UNITED STATES PATENTS

| | | | |
|---|---|---|---|
| 2,716,585 | 8/1955 | Bailey | 8/14 |
| 3,081,140 | 3/1963 | Ford | 8/4 |
| 3,117,831 | 1/1964 | Mautner | 8/4 |
| 3,502,495 | 3/1970 | Akamatsu | 8/4 X |

FOREIGN PATENTS OR APPLICATIONS

| | | | |
|---|---|---|---|
| 726,784 | 3/1955 | Great Britain | 8/4 |

OTHER PUBLICATIONS

Ex parte Schooner et al., Decision of the Board of Appeals Patent No. 2,743,991, Paper No. 23, 6 pp.

Ex parte Schoeneberg et al., Decision of the Board of Appeals Patent No. 3,190,718, Paper No. 27, 4 pp.

Ex parte Weissbein et al., Decision of the Board of Appeals Patent No. 3,679,351, Paper No. 18, 4 pp. 4 page dye list.

*Primary Examiner*—Thomas J. Herbert, Jr.
*Attorney, Agent, or Firm*—Howson and Howson

[57] ABSTRACT

Articles manufactured from uniformly colored plasticized polyvinyl chloride homopolymers and copolymers are dyed to provide them with the non-uniformly colored appearance usually associated with similar articles made from traditional materials. A solution in a volatile organic solvent of a dye soluble in the plasticized polyvinyl chloride homopolymers or copolymers is selectively applied to certain portions of the articles and permitted to penetrate into those portions to provide color contrast between the dyed and undyed portions of the article.

11 Claims, No Drawings

CONTRAST DYEING OF ARTICLES MANUFACTURED FROM PLASTICIZED POLYVINYL CHLORIDE HOMOPOLYMERS AND COPOLYMERS

CROSS-REFERENCE TO A RELATED APPLICATION

This application is a continuation-in-part of pending application Ser. No. 168,460 filed Aug. 2, 1971 now abandoned, which was a continuation-in-part of application Ser. No. 6,966, filed Jan. 29, 1970, now abandoned.

BACKGROUND OF THE INVENTION

This invention relates to the contrast dyeing of articles manufactured from plasticized polyvinyl chloride homopolymers and copolymers, and to the articles produced thereby. More particularly, this invention relates to the dyeing of portions of articles manufactured from plasticized polyvinyl chloride homopolymers and copolymers to provide a contrast in appearance between the dyed and undyed portions of the article, and to the thus dyed articles.

Plasticized polyvinyl chloride homopolymers and copolymers (referred to as plasticized polyvinyl chloride polymers hereinafter) have been utilized to manufacture various articles such as footwear, handbags, suitcases, cables, automobile fittings, and furniture, etc. generally utilizing a molding technique in which the plastisol is molded into the desired object. For example, British Pat. No. 726,784 describes a slush molding process in which such plasticized polymers are molded into footwear. Injection molding operations among other conventional plastisol molding techniques may be employed. In utilizing such processes, it is possible to treat the molds in such a manner that almost any desired shape or surface structure for the desired article can be obtained. However, molded articles manufactured from plasticized polyvinyl chloride polymers in such processes, while durable in use and economical to manufacture, suffer from the disadvantage that they have a uniform overall surface coloring presenting a plastic-like appearance which is in some instances neither attractive nor appealing to potential purchasers. For example, in the case of molded footwear, there is no contrast in color or appearance between the sole, heel and upper portions of the shoe, a factor seriously limiting the appeal of such footwear.

Attempts have been made to overcome the unattractive appearance of such uniformly colored plasticized polyvinyl chloride polymer articles such as by spraying or painting portions of the surface with pigmented paints and lacquers. However, it has been found that such paints and lacquers are undesirable for use on plasticized polyvinyl chloride polymer material since cracking or peeling of the paint film from the articles results in removal of the pigment and thus the desired color contrast. Such loss of color is, of course, highly detrimental to the appearance of the articles. The problem of cracking and peeling of pigmented paint films is particularly acute in the case of footwear which is normally subject to almost constant flexing and abrasion while it is worn, thus accelerating the degeneration of the paint film. This problem is not avoided in producing color contrasting articles by incorporating a pigment or dye into the plastisol before molding, since color added in this way is uniformly distributed throughout the plastisol and the resulting molded article.

It is, therefore, a principal object of this invention to provide articles manufactured from plasticized polyvinyl chloride polymers or copolymers dyed to improve their appearance by providing contrast between dyed and undyed portions thereof.

Another object of this invention is to provide a process for selectively dyeing portions of articles manufactured from plasticized polyvinyl chloride polymer in a convenient and economical manner. These and other objects of this invention are accomplished by the process set forth in detail hereinafter.

DETAILED DESCRIPTION OF THE INVENTION

According to this invention shaped articles of plasticized polyvinyl chloride polymers are selectively contrast dyed by a method which comprises applying one or more dyes soluble in the plasticized polyvinyl chloride polymers. The dyes useful in the invention include the azo, aniline, azine, xanthine and anthraquinone dyes. These dyes are applied to the articles to be dyed in solution in a volatile organic solvent. The dye solutions contain up to about 2 percent, by weight, of the dye, based on the total volume of the solution. After application, the soluble dyes are allowed to penetrate into the article. Optionally, film forming materials may be added to the solution of dye in a volatile organic solvent to provide a lacquer from which the dye may migrate into the plasticized polyvinyl chloride both before and after the lacquer dries. For this reason, any subsequent removal of the lacquer does not remove the color imparted to the article by dye which has already penetrated the polyvinyl chloride.

The articles dyed according to the present invention may be manufactured in any conventional manner from plasticized polyvinyl chloride homopolymers and copolymers and may take any shape.

The polyvinyl chloride homopolymers which may be utilized are those polymers of polyvinyl chloride having a K value of from about 60 to about 80, with those polymers having K value of 70 being especially preferred. In addition to polyvinyl chloride homopolymers, copolymers of polyvinyl chloride with polyvinylidene chloride and polyvinyl acetate may also be utilized. The copolymers of polyvinyl chloride and polyvinylidene chloride which are useful include those containing from about 70 to about 99 percent, by weight of polyvinyl chloride, based on the weight of the copolymer. Copolymers of polyvinyl chloride and polyvinyl acetate which are useful include those containing from about 90 to about 99 percent, by weight of polyvinyl chloride based on the weight of the copolymer. Those polyvinyl chloride copolymers having a K value between 40 and 80, and preferably in the range 45 to 70 have been found suitable for use in preparing shaped articles in most conventional processes.

Prior to molding or otherwise shaping the polyvinyl chloride polymers into the desired articles, the polyvinyl chloride polymers are modified by the addition of a suitable plasticizer to obtain the physical properties of the polyvinyl chloride polymer necessary or desirable to permit it to be molded or shaped into the particular articles being manufactured.

Suitable plasticizers for modification of the polyvinyl chloride polymers include the known primary and secondary plasticizers for these materials as well as mixtures of such plasticizers. The plasticizers are incorporated into the polyvinyl chloride polymers in amounts suitable to achieve the physical properties required for the particular molding or shaping method employed to make the finished articles. As a general rule, the plasticizer is combined with the polyvinyl chloride polymer in a proportion of from about 25 to about 60 percent, and preferably from about 35 to about 50 percent, by weight of polymer in the mixture.

In general, suitable plasticizers include esters of aliphatic and aromatic di- and tricarboxylic acids, and organic phosphates, among others. Primary plasticizers which have been found especially useful in preparing molded polyvinyl chloride polymer articles include dioctyl phthalate, didecyl phthalate, diisooctyl adipate, didecyl adipate and dioctyl sebacate. Secondary plasticizers found especially useful include dodecyl benzene and paraffin wax, octyl stearate, epoxidized plasticizers, e.g. epoxidized soybean oil and epoxyoctyl stearate, and chlorinated hydrocarbons.

Other plasticizers which are compatible with polyvinyl chloride and copolymers of polyvinyl chloride and polyvinylidene chloride, include: alkyl phthalates such as dimethyl, dibutyl, bis-(2-ethylhexyl), didecyl, dicyclohexyl and butylbenzyl phthalates; adipates such as bis-(2-ethylhexyl), and diisodecyl adipate; phosphates such as triphenyl, tricresyl, 2-ethylhexyl diphenyl, tris-(2-ethylhexyl) and tributoxy ethyl phosphate; methyl and butyl phthalyl ethyl and butyl glycolate and various polyesters, epoxides, and sulfonamides, among others, many of which are listed in the Encyclopedia of Chemical Technology, 2nd edition, Kirk-Othmer, Vol. 15, under Plasticizers, pages 720–789, and particularly pages 738–739 and elsewhere, which is incorporated herein by reference.

Other plasticizers compatible with polyvinyl chloride — polyvinyl acetate copolymers, include: phthalates such as dimethyl, dibutyl, dicyclohexyl and butylphenyl phthalate; phosphates such as triphenyl, tricresyl and 2-ethylhexyl diphenyl phosphate; methyl and butyl phthalate; ethyl and butyl glycolate; and various polyesters and sulfonamides, among others.

Mixtures of primary and secondary plasticizers can also be utilized in preparing moldable polyvinyl chloride polymers, the secondary plasticizer being utilized for specific desired effects. For example, inclusion of secondary epoxy plasticizers with primary plasticizers tends to stabilize the resultant plasticized polymer. Octyl stearate is useful to prolong the gel point of the plasticized polymer. Dodecyl benzene serves to extend the plasticized polymer and is generally included with primary plasticizers in the interest of economy.

As noted above, the plasticizer utilized to modify the polyvinyl chloride polymer may be exclusively a primary plasticizer or it may be a mixture of primary and secondary plasticizers in which the secondary plasticizer is present in the proportion of from about 4 to about 30 percent, by weight, based on the weight of the total plasticizer utilized with the polyvinyl chloride polymer.

In preparing the plasticized polyvinyl chloride polymer, the plasticizers are mixed with the polymer material in any of the well known manners such as by slowly stirring the plasticizer into the polymer material at a temperature of from about 10° to 40°C. until a homogeneous mixture is obtained.

To dye articles manufactured from the plasticized polyvinyl chloride polymers and copolymers described above, a dye selected from the group consisting of azo, aniline, azine, xanthine and anthraquinone dyes is applied to the article in the form of a solution in a volatile organic solvent, with or without added film-forming agents. The useful dyes include those which are soluble in the various plasticizers included in the plasticized polyvinyl chloride polymers, and are characterized as containing a minimum of water-soluble moieties, that is, the dyes are non-hydrophilic.

Among the useful azo dyes are amido azo benzene also known as Sudan Yellow RA (Color Index 11,000), 2-naphthol-azo benzene also known as Sudan I (Color Index 12,055), azo paraxylene azo 2-naphthol also known as Oil Red OS and naphthyl azo naphthene also known as Naphthylamine Bordeaux. Useful azine dyes include halogen complexes of indulin and nigrosin bases such as Indulin 3B base (Color Index 50,400) having the formula:

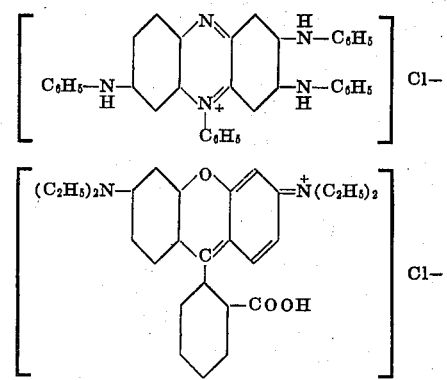

Useful anthraquinone dyes include those known as "Ceresviolett BRN" (Color Index 61,705), "Benzinblau," and "Ceresblau GN" (Color Index 61,520).

Other useful dyes include metal complexes such as the "Irgazet" dyes, "Fettschwarz HB", and oil Brown.

The dyes are applied to the articles to be dyed in the form of soultions in volatile organic solvents. Suitable solvents include ketones such as methyl ethyl ketone and acetone. The dyes are formed into solutions in the volatile organic solvents, the solutions containing up to as much as 2 percent, by weight of the dye in the organic solvent. While the lower limit of dye concentration varies with the dye and effect desired, in general, at least about 0.1 percent is employed, although less may be used in certain cases. As noted above, if desired, a film-forming agent may also be incorporated in the solution of dye in volatile organic solvent to make a lacquer. Suitable film-forming agents include acrylic homopolymers and polyvinyl chloride copolymers, for example, among other materials known in the art for this purpose. The concentrations employed are those known in the art for lacquer formulation.

In the practice of this invention, it is critical that the dye utilized to accomplish contrast dyeing be soluble in the plasticizer component of the molded polyvinyl chloride polymer. Upon application of the solution of the dye in the volatile organic solvent to molded or shaped plasticized polyvinyl chloride articles, the volatile solvent rapidly evaporates and the dye, which is soluble in the plasticizer components of the polyvinyl chloride polymer, dissolves in the plasticizer which absorbs the dye making it an intimate part of the polymeric material. The mechanism of dye absorption is the same when dye-containing lacquers are employed, with the dye continuing to migrate from the lacquer film into the plasticized polyvinyl chloride until exhausted from the film.

In preparing the dye solutions or lacquers, various factors are considered in determining the proper concentration of the dye solution to be applied to the polyvinyl chloride polymer articles, including the amount of dye to be applied per surface unit with higher or lower color intensities resulting from the application of greater or lesser concentrations of the dye per unit area of polymer material. Also important to consider is the solubility of the dye in the plasticized material incorporated in the polyvinyl chloride polymer. In cases where the dye is very soluble in the particular plasticizer, relatively weak dye solutions or lacquers may be utilized. On the other hand, if the dye is poorly soluble in a particular plasticizer incorporated into polyvinyl chloride polymeric materials, it is also necessary to use relatively weak dye solutions or lacquers to avoid supersaturation of the dye on the polymer surface. This occurs when the poorly soluble dye is not absorbed completely by the plasticizer so that unabsorbed portions of it remain on the surface of the polymer. The supersaturated dye produces a metallic glimmer or bronzing on the surface of the polymer creating an appearance which may be undesirable for certain purposes. As a practical matter, therefore, the proper amounts of dye to be applied to the plasticized polyvinyl chloride polymer surface to accomplish contrast dyeing thereof varies from 0.01 to about 1 mg. of dye per square centimeter of polymer surface, with the dye usually penetrating as much as 1 mm into the polymer material.

The solution of the dye in the volatile organic solvent may be applied to the plasticized polyvinyl chloride articles in any convenient manner. Thus the dye solution or lacquer may be painted or sprayed onto the desired surface areas of the article. No special temperature, time, pH or other factors are involved in either the application or penetration of the dye into the polyvinyl chloride polymer articles, with complete penetration of the dye into the polymer occurring within 24 hours of application. As the volatile solvent evaporates, dye particles are deposited on the surface of the polymeric material where they gradually dissolve in the plasticizer and migrate and penetrate into the polymer forming a dyed layer in the polymeric article itself which cannot be removed unless a portion of the article itself is worn away or removed.

While the method of contrast dyeing articles manufactured from plasticized polyvinyl chloride polymeric materials has been described in detail herein as it relates to the contrast dyeing of footwear, it is obvious that the method is eminently useful for contrast dyeing any article manufactured from such polymers such as flexible or rigid sheets, handbags, clothing, automobile fittings, furniture, or textiles coated with plasticized polyvinyl chloride polymers, among others, whether produced by molding, or other shaping techniques.

Example I

| Ingredient | Molding Composition<br>Parts By Weight |
|---|---|
| Vinyl chloride homopolymer | |

Example 1-Continued

| Ingredient | Molding Composition<br>Parts By Weight |
|---|---|
| (Emulsion polymer K-value 70-74) | 38 |
| Vinyl-vinylidene chloride copolymer | |
| (Suspension polymer K-value 62-65) | 12 |
| Dioctyl phthalate | 35 |
| Dioctyl adipate | 7 |
| "Abrac A" ** | 4 |
| Barium-cadmium stabilizer | 1.5 |

** "Abrac A" is an epoxidized soybean oil.

The above composition is formulated by conventional blending techniques and molded to form footwear by the process of British Pat. 726,784. A 0.2 percent solution of "Irgazet-brown 2 RL" (Solvent brown 43), in methylethyl ketone is sprayed only on selected protions of the footwear. The solvent evaporates immediately and in practice only the pure dye particles reach the surface of the footwear being sprayed. The dye applied in this way dissolves and migrates into the plasticizer (dioctyl phthalate-dioctyl adipate mixture) of the molded mixed polymer to produce a natural appearing brown leather-like appearance.

Example II

| Ingredient | Molding Composition<br>Parts By Weight |
|---|---|
| Vinyl chloride homopolymer | 630 |
| Vinyl-vinylidene chloride copolymer | 234 |
| Vinyl-chloride-vinyl acetate copolymer | 36 |
| Diisooctyl phthalate | 288 |
| Diisodecyl phthalate | 117 |
| Diisodecyl adipate | 162 |
| Monomeric epoxy ester | 63 |
| Ba- Cd- Zn stabilizer | 27 |
| Pigment-paste | 15 |

The above composition is formulated by conventional blending techniques and molded to form footwear by the process of British Pat. No. 726,784.

A 0.24 percent solution of "Irgazetbrown 2 RL" (Solvent brown 43) and "Irgazetschwarz RL" (Solvent black 29), in ratio 2:1 was solved in a clear lacquer consisting of:

| Ingredient | Component A<br>Parts By Weight |
|---|---|
| Polymethylmethacrylate homo-polymer, MN about 500,000 | 25 |
| Copolymeric vinyl-chloride-vinylacetate (40% vinyl acetate, K-value 60) | 38 |
| Copolymeric polybutylmethacrylate linoleictriglyceride (40% linseed oil; viscosity: 120-180 Ford cup in 50% xylene) | 12 |
| Cellulose ester (20% acetic acid and 44% butyric acid) | 3 |
| Methyl ethyl ketone | 330 |
| Component B | |
| Compound A | 205 |
| Xylene | 616 |
| Methyl isobutyl ketone | 205 | and is sprayed only on selected portions of the footwear. The solvent evaporates in a very short time on the surface of the footwear and the dye together with the binding agent forms a film. From this film the dye migrates by dissolving in the plasticizer of the molded mixed polymer to produce a natural appearing brown leather-like appearance.

Example III

| Ingredient | Molding Composition<br>Parts By Weight |
|---|---|
| Vinyl chloride homopolymer<br>Emulsion polymer K-value 70–74 | 46 |
| Vinyl chloride homopolymer<br>(suspension polymer K-value 69–71) | 4 |
| Dioctyl phthalate | 32 |
| Dioctyl adipate | 11 |
| Epoxidized soybean oil | 4.5 |
| Ba-Cd-Zn stabilizer | 1.5 |
| Pigment-paste | 1 |

The above composition is formulated by conventional blending techniques and molded to form footwear by the process of British Pat. No. 726,784.

A 0.15 percent solution of "Ceresschwarz G" *** in acetone is sprayed only on selected portions of the footwear. The solvent evaporates in a very short time on the surface of the footwear, and the dye applied in this way dissolves and migrates into the plasticizer of the molded mixed polymer to produce a natural appearing black leather-like appearance.

*** "Ceresschwarz G" is a blend of mixed anthraquinone and mono azo dyes (Color Index Nos. 61,565; 12,700; and 61,705).

Example IV

Footwear produced by molding a composition such as that of Examples I, II and III above is partially dyed by dissolving 1 part "Sudanbraun 3 B" and
2 parts "Nigrosine Base" (Color Index 50,415) in methyl ethyl ketone to give a solution containing 0.15 percent total dye by weight, etc.

Example V

Footwear produced by molding a composition such as that of Example I above is partially dyed by the procedure of Example I, but employing a mixture of the brown dye, "Irgazet-brown 2 RL," used in Example I and a black dye, "Fettschwarz HB" in a ratio of 2:1, by weight, dissolved in methyl ethyl ketone to give a solution containing 0.24 percent total dye by weight. The solvent evaporates immediately during the spraying operation with the result that only pure dye particles reach the surface of the footwear. In this way the mixed brown and black dyes are applied and allowed to dissolve and migrate into the plasticizer of the plastic composition to provide a durable contrast dyed article of desirable appearance.

Example VI

The upper portion of molded footwear produced as above is dyed by spraying thereon a 0.1 percent by weight solution of oil brown dye in acetone. While acetone does not evaporate as rapidly as methyl ethyl ketone, it does dry rapidly to leave the pure dye particles on the surface of the plasticized plastic in a substantially dry state. On standing, the brown dye migrates into the uppers of the footwear to provide the desired appearance of brown leather. The sole portions of the same footwear are then dyed by the same procedure using a solution of the black dye of Example II to produce a black sole of contrasting color to the brown uppers, thus achieving the appearance of conventional brown leather footwear with black rubber soles.

These same general procedures may be employed to dye in contrasting colors, shades or tones, shaped articles of any description composed of any of the vinyl homopolymers, copolymers or mixtures thereof recited above plasticized with any suitable plasticizer; the dye employed being one which is soluble in the plasticizer of the polymer being dyed in sufficient amount to alter the color thereof.

Examples VII

Shaped articles composed of a vinyl polymer as described hereinabove are dyed by spraying a dye powder directly onto only selected portions of the plasticized vinyl chloride homopolymer or copolymer which has a coating or film of plasticizer on its surface. The powdered dye particles adhere to the film of plasticizer and gradually dissolve in the plasticizer and migrate into the plasticized polymer article to form a dye layer therein. Such dissolution and migration is generally sufficiently complete in about 24 hours to provide a permanently dyed article having color contrasting dyed and undyed areas, or if dyed all over with more than one dye, of areas of contrasting dye colors.

Although the present invention has been described in conjunction with the dyeing of footwear of particular compositions with particular dyes, it will be apparent to those skilled in the art that articles of any shape composed of plasticized vinyl chloride homopolymers or copolymers, may be provided with areas of contrasting color by the application thereto, in selected areas, of one or more suitable dyes sufficiently soluble in the plasticizer of the polymer to impart color thereto.

Example VIII

Footwear produced by molding a composition such as that of Example I is partially dyed by "Irgazet-schwarz RL" (Solvent black 29). The powder was applied by brushing through a very fine screen (300 mesh) upon the surface of the footwear. The dye migrates by dissolving in the plasticizer of the molded mixed polymer to produce a natural appearing leather-like appearance.

Example IX

A 0.24 percent solution of "Irgazet-braun 2 RL" and "Irgazet-schwarz RL" in the ratio 2:1 in a clear lacquer consisting of 3 percent acrylic homopolymer,
3 percent polyvinyl chloride copolymer, and
94 percent methyl ethyl ketone was applied to the footwear as in Example VI. After a short time the solvent evaporated and the dye penetrated into the footwear and formed a dyed layer which could not be removed unless the surface of the footwear itself was destroyed.

What is claimed is:

1. A method for positively and quickly contrast dyeing shaped solid flexible articles with firm unsoftened surfaces composed of a solid, plasticized polyvinyl chloride polymer selected from the group consisting of homopolymers of vinyl chloride, copolymers of vinyl chloride and vinylidene chloride, copolymers of vinyl chloride and vinyl acetate, and mixtures thereof, which comprises positively applying at ambient temperature to selected portions of the surface of the shaped article a dye sufficiently soluble per se in the plasticizer of said solid polymer to impart color thereto thereby causing said dye to dissolve in said solid plasticized polymer and penetrate into the shaped article to form a dyed layer therein, without the aid of another penetrant.

2. The method of claim 1, wherein the dye is applied to said shaped article by spraying.

3. The method of claim 2, wherein the dye is applied in a dispersion in a volatile dispersing agent.

4. The method of claim 2, wherein at least two dyes of differing color are applied separately to selected areas of the surface of said article to provide a contrast in color between the area receiving one dye and the area receiving another dye.

5. The method of claim 1, wherein the dye is applied in solution in a volatile solvent therefor.

6. The method of claim 5, wherein the shaped article is composed of a plasticized vinyl chloride homopolymer.

7. The method of claim 5, wherein the shaped article is composed of a plasticized copolymer of vinyl chloride and vinylidene chloride.

8. The method of claim 5, wherein the shaped article is composed of a plasticized copolymer of vinyl chloride and vinyl acetate.

9. The method of claim 5, wherein the shaped article is composed of a mixture of plasticized vinyl chloride homopolymer and a copolymer of vinyl chloride with vinylidene chloride or vinyl acetate.

10. The method of claim 5, wherein a film-forming agent is incorporated in said solution to form a lacquer.

11. A method for positively and quickly contrast dyeing solid flexible articles with firm unsoftened surfaces manufactured from plasticized polyvinyl chloride polymers selected from the group consisting of homopolymers of vinyl chloride, copolymers of vinyl chloride and vinylidene chloride, copolymers of vinyl chloride and vinyl acetate, and mixtures thereof, which comprises applying at ambient temperature to said articles a dye soluble per se in said solid plasticized polymers, said dye being selected from the group consisting of azo, aniline, azine, xanthine and anthraquinone dyes and dyestuffs containing metal-complexes which are soluble in the plasticizer of said polymers, said dye being positively applied to said articles as a solution in a volatile organic solvent containing up to 2 percent, by weight, of the dye base on the total weight of the solution, thereby causing the soluble dye to penetrate into the article to form a dyed layer therein and the solvent to evaporate.

* * * * *